(12) United States Patent
Brunet et al.

(10) Patent No.: US 7,643,826 B2
(45) Date of Patent: Jan. 5, 2010

(54) MOBILE CARE ENGINE SYSTEM

(75) Inventors: Jeffrey Brunet, Toronto (CA); Ian Collins, Markham (CA); Yousuf Chowdhary, Maple (CA); Stephen Kim, Thornhill (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 446 days.

(21) Appl. No.: 10/889,693

(22) Filed: Jul. 12, 2004

(65) Prior Publication Data

US 2005/0149368 A1 Jul. 7, 2005

Related U.S. Application Data

(60) Provisional application No. 60/534,426, filed on Jan. 7, 2004.

(51) Int. Cl.
*H04W 24/00* (2009.01)

(52) U.S. Cl. .................. 455/423; 717/105; 717/114; 717/121; 717/125; 717/127; 717/156; 717/170; 717/172; 717/117; 717/178; 705/7

(58) Field of Classification Search .......... 455/423; 717/105, 114, 121, 125, 127, 156, 170, 172, 717/117, 178; 705/7

See application file for complete search history.

(56) References Cited

U.S. PATENT DOCUMENTS

| | | | | |
|---|---|---|---|---|
| 5,463,766 A | * | 10/1995 | Schieve et al. | 713/2 |
| 6,047,279 A | * | 4/2000 | Barrack et al. | 706/60 |
| 6,081,731 A | * | 6/2000 | Boltz et al. | 455/565 |
| 6,622,017 B1 | * | 9/2003 | Hoffman | 455/419 |
| 6,690,788 B1 | * | 2/2004 | Bauer et al. | 379/242 |
| 6,697,808 B1 | * | 2/2004 | Hurwood et al. | 707/10 |
| 6,728,531 B1 | * | 4/2004 | Lee et al. | 455/419 |
| 6,730,027 B2 | | 5/2004 | Iliff | |
| 6,856,676 B1 | * | 2/2005 | Pirot et al. | 379/201.01 |
| 7,055,098 B2 | * | 5/2006 | Hull et al. | 715/530 |
| 7,240,356 B2 | * | 7/2007 | Iki et al. | 725/48 |
| 2001/0053688 A1 | * | 12/2001 | Rignell et al. | 455/414 |
| 2003/0133552 A1 | | 7/2003 | Pillai et al. | |
| 2003/0143991 A1 | * | 7/2003 | Minear et al. | 455/419 |
| 2004/0058652 A1 | | 3/2004 | McGregor et al. | |
| 2004/0059725 A1 | | 3/2004 | Sharangpani et al. | |
| 2004/0242286 A1 | * | 12/2004 | Benco et al. | 455/574 |

FOREIGN PATENT DOCUMENTS

WO  WO98/38823  * 9/1998

OTHER PUBLICATIONS

"ILOG Delivers Enterprise—Wide Business Rule Management With ILOG JRules 4.5", Press Release, ILOG, found at <http://www.ilog.com/corporate/releases/us/030610_jrules45.cfm> (Jun. 10, 2003).
"ILOG JRules—Complete business rule management", ILOG, found at <http://www.ilog.com/products/jrules/datasheet> (May 2003).

* cited by examiner

*Primary Examiner*—Rafael Pérez-Gutiérrez
*Assistant Examiner*—Nimesh Patel

(57) ABSTRACT

A mobile care engine system is provided for delivering customer care to mobile devices, comprising. The mobile care engine system compares profile data from a mobile device with reference data and highlights any inconsistencies between the data, so that the device can be optimized. The inconsistencies are preferably determined using rule-based processing, and are automatically highlighted on the device display itself, or on a display of a customer service representative interface. Optionally, the system allows for corrective patches or settings to be sent to the device.

19 Claims, 4 Drawing Sheets

Figure 4

MOBILE CARE ENGINE SYSTEM

RELATED APPLICATIONS

This application claims the benefit of U.S. Provisional Application Ser. No. 60/534,426, filed Jan. 7, 2004.

FIELD OF THE INVENTION

The invention relates to systems for providing customer care, and more particularly to systems for providing customer care for telecommunications devices.

BACKGROUND OF THE INVENTION

For the first time in the history of telecommunications networks, significant computing power has become available to the end user's device. This welcome change has the ability to reshape the architecture of all mobile telecommunications networks. Traditionally the Operational Support Systems/Business Support Systems (OSS/BSS) were large-scale, extremely complex, centralized systems within the network. With the proliferation of next generation smartphones and wireless PDAs, significant intelligence can be pushed out to the subscriber terminal, and thus the ability to greatly simplify OSS/BSS has emerged.

The telecommunications industry is on the verge of a revolution in support system technologies. A rare intersection of technological change has become apparent in the mobile industry. Mobile data networks have been deployed around the world. These networks provide fast reliable packet data to subscriber's mobile devices. At the same time, intelligent mobile devices (smartphones) have emerged as capable computing platforms with considerable processing power, onboard storage and memory.

Smartphones are devices running feature rich operating systems such as Symbian, PalmOS, Microsoft WinCE, BREW (Binary Runtime Environment for Wireless) and Java MIDP compliant devices. Due to the complex nature and multitude of new features, these smartphones are difficult to configure; compounded with limited keyboards, entering information such as personal details and configuration settings is not only difficult but also highly prone to human errors. A combination of complex features and associated configuration requirements, provides the opportunity to exponentially improve upon the customer support solutions for wireless network operators. Intelligent client-based OSS systems have now become possible.

With the wide availability of downloadable services and applications available for smartphone users, and the increasing costs of customer care, ensuring efficient and less-cumbersome support when problems arise is an increasing necessity. In contrast to traditional customer service applications that are available in contact centers (or customer care centers) today, CSRs (Customer Service Representatives) must undertake the extensive and time-consuming task of asking customers complex questions pertaining to their wireless devices for problem diagnosis. This requires CSRs to be experts on smartphones and their applications, and also requires customers to spend increased time on the telephone to receive support for their applications. The result is increased support costs, increased call handling times, complex diagnostic processes and overall frustration.

The current method of gathering and obtaining smartphone information required for diagnostics is manual and therefore complex, time consuming and prone to human errors. This problematic approach is an ineffective method of just-in-time customer support and does not guarantee effective problem resolution. These current customer support methods leave both the subscribers and customer support staff frustrated. In addition, obtaining diagnostic information requires a specialized support staff and contact centers must therefore hire and train specialized staff for specific tasks. For the service provider this means increased hiring and operational costs.

The customer support process is increasing in complexity. Once device-specific profiles have been obtained from subscriber devices, then must begin the arduous task of identifying inconsistencies in the subscriber's configuration data in order to diagnose and resolve problems. The level of expertise required by the CSR to understand numerous smartphones and to search for up-to-date configuration data leads to increased costs in training, call-durations, and the overall operational costs.

With the emergence of smartphones and wireless PDAs and their ability to download and install applications, the wireless industry is poised to see explosive growth in application usage by subscribers. Mobile operator customer care centers are focused on solutions for closed, voice-centric mobile phones. This infrastructure is not suited to efficiently solve the intelligent mobile data device and application problems described above. The proliferation of next generation smartphones and the complexity of issues and problem solving needed, requires a customer care application specifically tailored to meet these emerging business needs.

SUMMARY OF THE INVENTION

Mobile Diagnostix Inc. (MDI) is the owner of U.S. Patent Application Ser. No. 60/461,886, "Mobile Care Framework", filed Apr. 11, 2003, the disclosure of which is incorporated herein by reference. The present invention, which builds on the Mobile Care Framework, leverages the power of next generation devices and wireless packet data networks to accurately analyze and diagnose issues with subscriber's smartphone configuration and application settings.

It is an object of the present invention to provide a rules-based software solution that analyzes and compares a subscriber's configuration settings against a set of "reference" or latest device-specific configuration settings to optimize execution of data services and applications. The analyzed data is then presented to the CSR who can explain to the subscriber the inconsistencies in their smartphone configuration settings. As used herein, the words "subscriber", "user" and "customer" are intended to have the same meaning, which is the individual who owns or uses a mobile device, such as a smartphone, and who subscribes to a mobile service. Given the number of smartphones available in the market and the varying degrees of next generation services, our invention provides an automated method of analyzing, matching, and presenting device inconsistencies to the CSR. This automatic analysis and comparison of data reduces the manual effort in performing lengthy comparison and reduces support times and overall costs.

It is a further object of the present invention to use data analysis to target the specific intricacies of smartphone customer care.

It is a further object of the present invention to focus on the unique requirements of mobile service providers. Using rich analytics processes targeted specifically to engage in complete customer lifecycle management for the wireless market, the present invention is a key component of the Mobile Care Framework for analyzing downloaded device-specific profile data and identifying known problems or incorrect device settings.

Analyzing the downloaded device profile data from wireless devices and presenting the inaccuracies as highlighted items to the CSR will result in faster, more efficient and more accurate customer support for the rapid resolution of problems. Benefits of this method include:

Reduced overall resolution times

Reduced Average Call Handling Times (ACHT)

Reduced number of call escalations

Superior method of diagnosis through automatically applying rules-based scenarios to identify inconsistencies in current configuration settings Reduction in human error Increased customer satisfaction The present invention, the overall system of which can be understood as a "Mobile Care Engine System", preferably works in conjunction with a resident database of "reference values", which may be frequently updated by the service provider and peer development community with device configuration settings, known bugs, problems and upgraded software/hardware information.

The present invention alleviates the difficulties faced both by end users and CSRs who must wade through highly technical web sites, complex documentation, or long and cryptic "question and answer" sessions to get the information they need. The present invention aims to streamline this process, simplifying the support experience for subscribers and support technicians alike.

The present invention preferably employs a rules-based engine to review the configuration data collected by a Smartphone Profiler (such as the Smartphone Profiler described in U.S. Provisional Patent Application Ser. No. 60/525,794, filed Dec. 1, 2003, the disclosure of which is incorporated herein by reference) to identify inconsistencies in the configuration settings or highlight known bugs/fixes with various smartphone settings or downloaded applications/services. These inconsistencies or known limitations/bugs are presented to the CSR for diagnostics and further troubleshooting. The present invention provides a solution focused primarily on the mobile market, applying an understanding of the mobile service provider's business processes. The invention seeks to employ intelligent rules-matching processes to simplify customer care of mobile devices and decrease customer care costs.

According to a first aspect of the invention, a mobile care engine system is provided for providing customer care to mobile devices (such as smartphones). The mobile care engine system comprises:

a customer care application including a display;

a first data store containing profile data from at least one mobile device;

a second data store containing reference value data for the at least one mobile device;

an analytics engine in communication with the customer care application and the first and second data stores, comprising:

a comparing means for comparing profile data for the at least one mobile device with reference value data for the at least one mobile device;

an identifying means for identifying inconsistencies between the profile data and the reference value data; and a highlighting means for highlighting, for each said inconsistency identified, the reference value data that should be activated in the mobile device, wherein the inconsistency is highlighted on the display.

Preferably, the mobile care engine system further comprises means for activating the reference value data in the mobile device to rectify the inconsistency identified. The reference value data may be locally or remotely activated in the device. That is, the mobile device may be reconfigured or patched on-site at a customer care center or device retailer, or the device may be remotely reconfigured or patched, using over-the-air transmission of information or files.

The profile data preferably comprises any of the following: configuration settings, resident applications and version numbers, make and model of the mobile device, total and available memory, total and available storage, battery life, connection strength, connection settings, user requests, usage statistics, soft reset count, recently used applications, memory heap.

The reference value data preferably comprises optimized values of any of the following: configuration settings, resident applications and version numbers, make and model of the mobile device, total and available memory, total and available storage, battery life, connection strength, connection settings, user requests, usage statistics, soft reset count, recently used applications, memory heap.

The display may comprise a customer service representative graphical user interface, or it may comprise a display on the mobile device itself.

Preferably, the analytics engine uses a rule set to perform the comparing, identifying and highlighting functions. The rule set preferably comprises rules that are to be processed in a preselected order. The rules preferably use an "IF . . . THEN" syntax, in which:

the "IF" portion of each rule comprises a comparison between a profile data field and a reference value field for a particular mobile device; and the "THEN" portion of each rule passes an inconsistency value to the identifying means if an inconsistency is determined in the "IF" portion.

In order to allow authoring and editing the rule set, the mobile care engine system preferably further comprises a rules authoring interface.

Although a smartphone is used as the preferred embodiment in the present application, other types of mobile devices can also be used, such as a personal data assistant (PDA), or any type of wireless-networked computer, including a computer embedded in an appliance. For instance, the "smartphone" could in fact comprise a PDA or advanced PDA, a mobile terminal, a camera, a toy, a gaming station, a vending machine, a vehicle, an appliance (such as a microwave oven or a coffee maker), or practically any kind of device capable of using data transmission means for communication.

BRIEF DESCRIPTION OF THE FIGURES

The following diagrams are used to aid in describing our invention:

FIG. 4 shows an example of the device-specific data 400 presented to the CSR. The inaccurate information is highlighted for faster problem turn around time.

DETAILED DESCRIPTION OF THE PREFERRED EMBODIMENT

Figure 1:
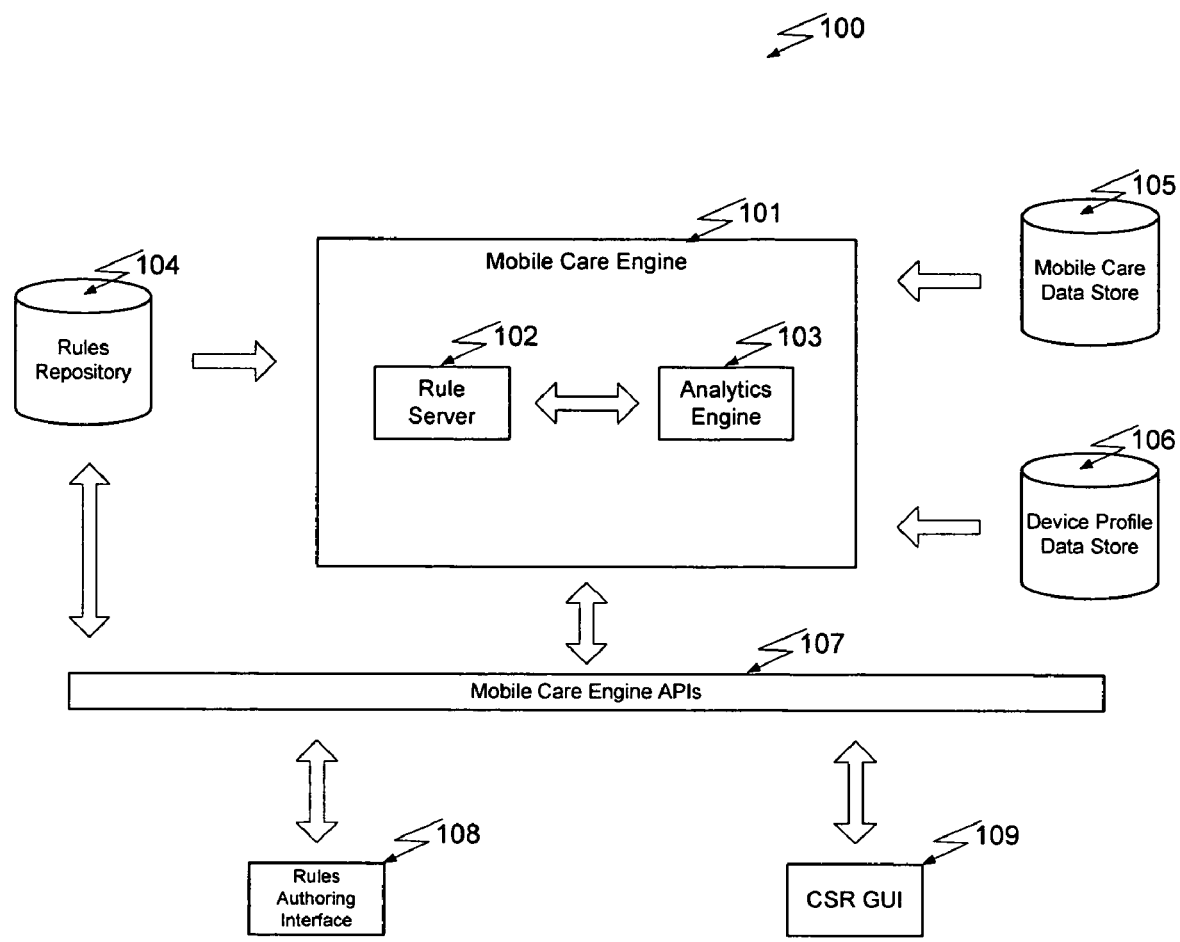
FIG. 1 shows an overview of the architecture of the present system 100.

The diagram in FIG. 1 shows the high-level architecture overview of the present system 100.

Mobile Care Engine 101

The system component referred to in this detailed description and the figures as the "Mobile Care Engine" 101 has the logic to apply rules from the Rules Repository 104 and compare device profile data with the "reference values" to identify inaccuracies and inconsistencies. The Mobile Care Engine 101 consists of a Rule Server 102 and Analytics Engine 103.

Rules Repository 104

The Rules Repository 104 contains the domain knowledge coded in the form of rules. Generally the rules are written in a high-level business language that relates to the domain, storing the rules in the repository 104. Both the Mobile Care Engine 101 and the Rules Authoring Interface 108 employ the Rules Repository 104.

Data Stores 105, 106

Data Stores 105, 106 include one or more databases used to:

store the "Reference Values" i.e. actual, required values for different fields (e.g. SMTP Server, Gateway IP addresses, User name, Passwords etc.); and gather, classify and store device profile data that has been collected from various devices over a period of time.

Preferably, the system 100 includes two data stores:

1) A Mobile Care Data Store 105 to store device "Reference Values" as they should be; and
2) A Device Profile Data Store 106 to store device profiles as "Gathered Values" gathered from individual devices 106.

Preferably, the Data Stores 105, 106 are hosted by a JDBC-compliant database system. Connection from the application server (not shown) is preferably handled by a connection pool (not shown) where a set number of connections are established by the application server and distributed to threads requiring a database connection. Connection from the Mobile Care Engine 101 is preferably handled by a dedicated connection for each analytics engine 103 process.

Once device data is collected 106, the Analytics Engine 103 compares the data against the "Reference Values" 105 for validation purposes and highlights the inconsistencies in the profile. For example, if the firmware version collected from the subscriber's device is v1.0 and the Analytics Engine 103 identifies the latest version to be 1.1, it is highlighted in the CSR-GUI 109. This leads to easier resolution of a customer's problem and the issue can further be resolved by uploading the latest version of the firmware to the subscriber's device.

Mobile Care Engine APIs 107

The Mobile Care Engine (MCE) APIs 107 expose the mobile care engine 101 for connecting with external components. As shown in FIG. 1, the Mobile Care Engine 101 exposes an API for connectivity with any external applications either synchronously preferably using Remote Method Invocation (RMI) or asynchronously preferably using Java Message Service (JMS). As an example, both the Rules Authoring Interface 108 and the CSR-GUI 109 use the MCE-APIs 107 for interaction with the internal components.

Rules Authoring Interface 108

The Rules Authoring Interface 108 is the mechanism of creating, deleting, and modifying rules that are stored in the Rules Repository 104.

CSR-GUI 109

The CSR-GUI 109 is a graphical user interface used by the Customer Service Representative for viewing and analysis of the smartphone's device profile data. The CSR-GUI 109 is preferably a web-based XML-driven dynamic system. It displays the inconsistencies found by the Analytics Engine 103 highlighting the areas of incorrect information.

The screens preferably use JSPs (Java Server Pages) for layout and branding customizations. The JSPs dynamically generate the screens and the relevant information based on the access-level of the Customer Service Representative. The session management and transactional logic are preferably handled via the application server using EJB technologies (Session Beans, Entity Beans). By using this method, future branding and/or text changes can be made without customizations to the application logic.

The CSR-GUI 109 presents the incorrect values as highlighted items thus allowing the CSR to quickly diagnose and resolve problems. This automated process reduces the time spent manually collecting information and therefore reduces ACHT, promoting to reduced customer care expenses.

A high level description of the process followed by the present system 100 is given below:

1. The smartphone setting profile is gathered from the device
2. This profile is put in the Device Profile Data Store 106
3. Using the rule set this profile is compared with the reference data in the Mobile Care Data Store 105
4. Rules and analytics are applied to this profile
5. The inconsistencies in this profile are highlighted
6. These inconsistencies are preferably presented to the CSR via the CSR-GUI 109

Analytics Engine 103

The Analytics Engine 103 is a component of the Mobile Care Engine 101 that applies business intelligence and rules-based scenario/symptoms to identify common or known problems/inconsistencies with a subscriber's smartphone.

The Analytics Engine 103 works in conjunction with the Smartphone Profiler and is an integral module of the present system 100. It can be used in conjunction with the Smartphone Profiler to present and identify current and required device information. This method of analytics and presentation greatly simplifies the overall customer care process by automatically identifying inconsistencies in a smartphone subscriber's device settings.

Using a flexible rules-based approach, the Analytics Engine 103 can process device-specific data and correlate device profile characteristics with known problems. The Analytics Engine 103 preferably runs on its own process to connect to the main application server (not shown). The independent process enables the Analytics Engine 103 to be upgraded, load-balanced and failed-over transparently and separately from the application engine. The Analytics Engine 103 also preferably uses its own rule-compiler to allow for complex rules and filters.

The Analytics Engine 103 compares the latest information pertaining to data applications 105—for example, latest version numbers, device configuration settings and other configuration data required for operation of data services with the ones gathered from the device 106. The inconsistencies are then highlighted and presented in the CSR-GUI 109. Alternatively, or in addition, the inconsistencies may be highlighted on a display on the device itself, or otherwise presented or communicated to the subscriber, for instance, using a web application, phone, or interactive voice response (IVR) system. The transaction may be CSR-assisted or by selfcare.

Figure 2:
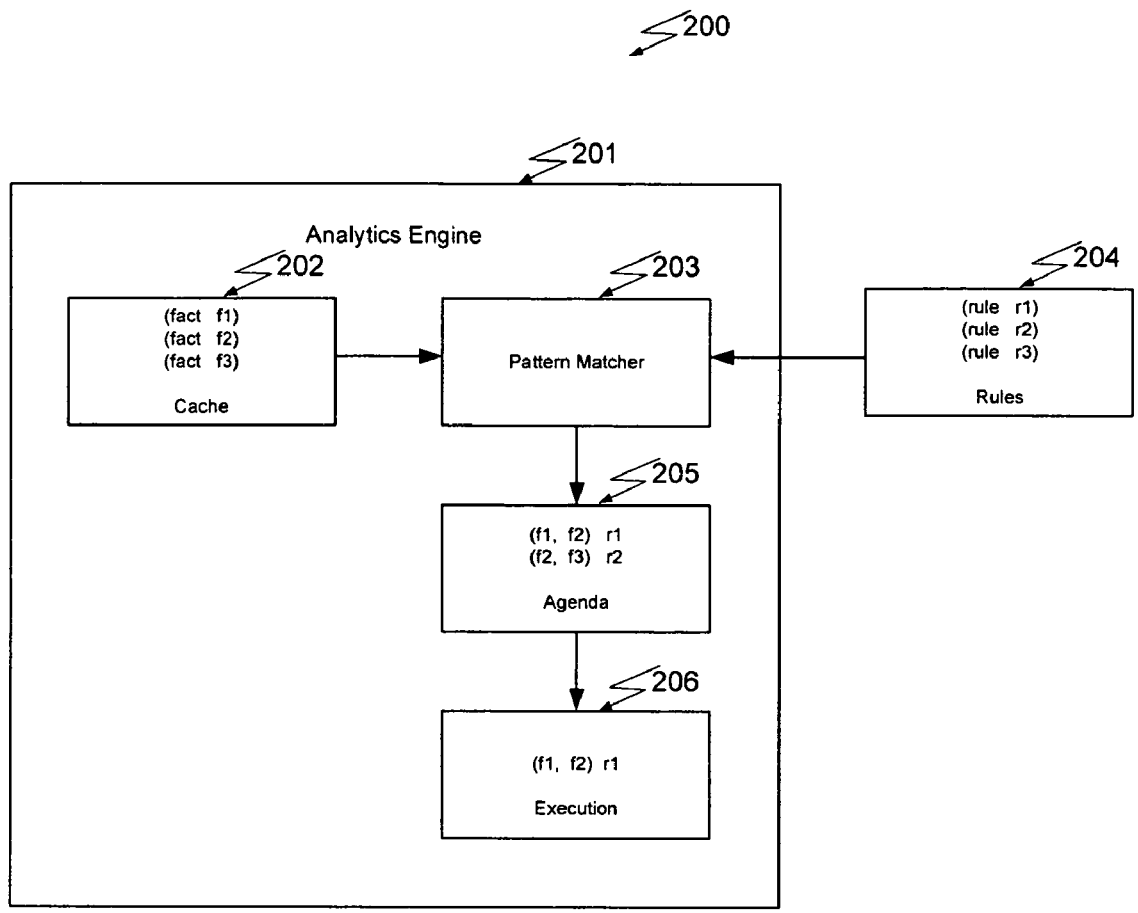
FIG. 2 shows the Analytics Engine 201 in detail and its sub-components.

As shown in FIG. 2, the Analytics Engine 201 preferably consists of the following sub-components:

Execution Context 206

The Execution Context 206 represents the runtime environment for the Analytics Engine's 201 execution. During the Analytics Engine's 201 execution cycle, an Execution Context 206 would hold a physical grouping between a specific instance of the agenda 205 and the working memory. More than one Execution Context 206 can simultaneously exist and share the same rules-set 204.

Agenda 205

The Agenda 205 tracks the prioritised rules 204 selected by the Analytics Engine 201 during the Pattern Matching 203 logic cycle.

Pattern Matcher 203

The Pattern Matcher 203 is a regular expression matcher. Using the Pattern Matcher 203 all rules 204 are compared to facts 202 to decide which rules 204 should be activated.

Cache 202

The Cache 202 contains the current state of fact 202 and the results of the current rules 204 in the agenda 205.

FIG. 2 further illustrates the analytics process. In the diagram in FIG. 2, the Analytics Engine 201 takes a query as an input. A query is a fact that contains some (query) variables, which are replaced by objects in the answer of the query.

When the Analytics Engine 201 is invoked, it retrieves an appropriate rule 204 set from the Rule Server and processes them in the correct order. All the rules 204 are compared to Cache 202 (using the Pattern Matcher 203) to decide which ones should be activated. This unordered list of activated rules 204 is ordered to form the Agenda 205—the list of rules 204 whose right-hand sides (actions) will be executed. Once the Analytics Engine 201 decides what rule 204 to execute 206, it executes 206 that rule's 204 action part. The Analytics Engine 201 preferably returns the result as an instance of ResultSet, a structure very similar to the result set used in JDBC.

The method next( ) and previous( ) can be used to navigate through the result set (not shown). If the result set cursor is positioned on a valid position, results can be fetched similar to fetching column values in a JDBC query.

Each exception encountered when executing 206 a rule 204 leads to an exception thrown by the Analytics Engine 201, and the process is canceled.

Sample Rule
 Rule: DeviceId
 Description: If
  manufacturer equals ?1
  AND
  model equals ?2
  AND
  revision equals ?3
 Then
  set device id to output The process flow of the Analytics Engine 201 is as outlined below:
1. The Analytics Engine 201 parses the rule set 204 from the rule repository.
2. A client issues a query to the Analytics Engine 201. The query contains variables.
3. The Analytics Engine 201 takes the query.
4. The Cache 202 contains all the pieces of information the Analytics Engine 201 is working with.
5. The Pattern Matcher 203 applies all the conditions in the rule 204 to the facts in the Cache 202.
6. The Analytics Engine 201 decides what rule 204 to execute 206 according to the Agenda 205
7. The Analytics Engine 201 executes 206 the action part of that rule 204.
8. The Analytics Engine 201 returns the result.

Figure 3:
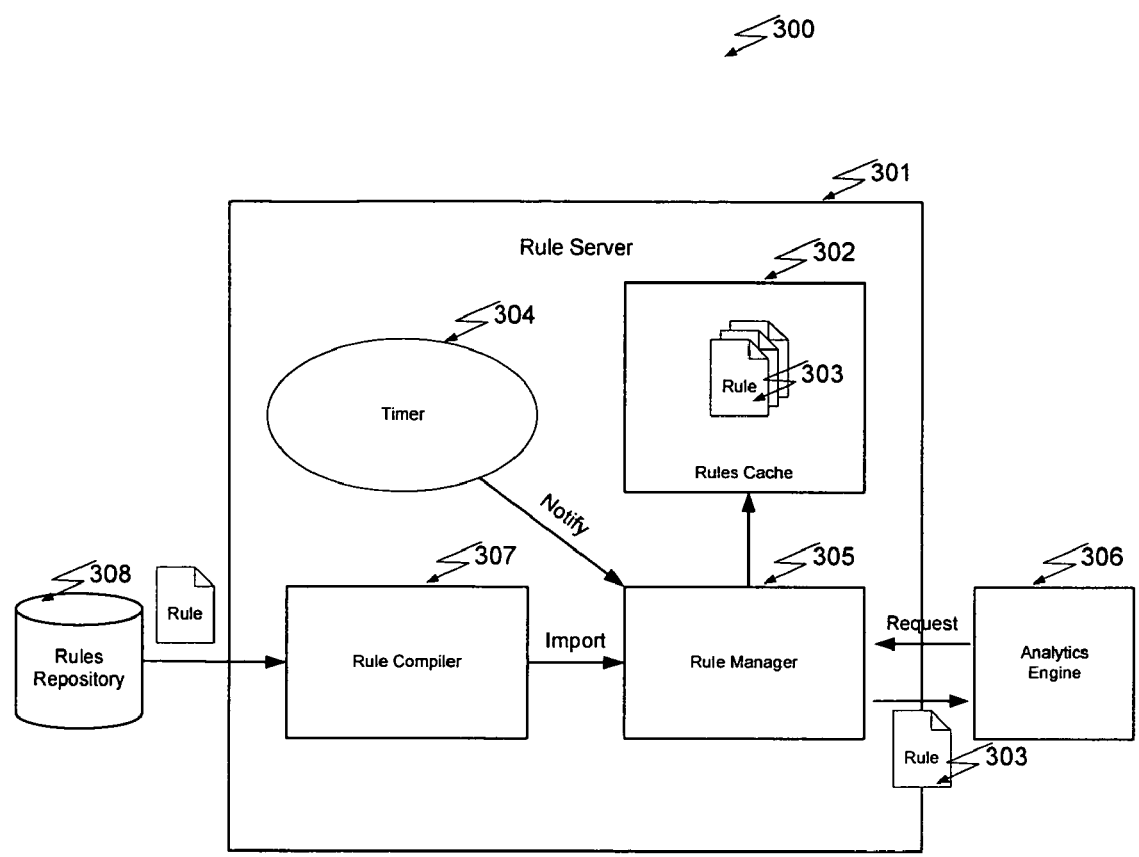
FIG. 3 shows the Rules Server 301 in detail and its sub-components.

The diagram in FIG. 3 illustrates the sub-components of the Rule Server 301.

Rule Server 301

The Rule Server 301 accesses the Rules Repository 308 and loads the correct rules-set into the Rules Cache 302, at start-up.

Rule Compiler 307

The Rules Compiler 307 in the Rule Server 301 is invoked whenever a new rule is received from the Rules Repository 308 or a rule is updated. It parses the received rule and creates an internal tree representation of the XML elements and values. It also optimizes the internal representation of rule sets so that they can be processed more efficiently. It then forwards this data structure to the Rule Manager 305.

Timer 304

When a scheduled date and time is reached, or a specified period or interval has elapsed, the Timer 304 service notifies the Rule Manager 305. By using the timestamp of the rule documents in the repository 308, the Rule Manager 305 detects changes to its rules in the Rule Repository 308.

Rules Cache 302

In order to enhance performance the most commonly used rules 303 are loaded in the cache 302 memory. Since the rules 303 are running in memory, any changes to rules 303 do not require system down time to upgrade the set of rules 303.

Rule Manager 305

The Rule Manager 305 holds all current rules in their optimised internal representation. A new version of an existing rule 303 replaces an older version when it is added to the Cache 302. The rule base name and version information are used in order to manage these rule updates. Once customer data is gathered from a smartphone, the Analytics Engine 306 can then access the rule sets 303 when they need to be processed.

Figure 4:
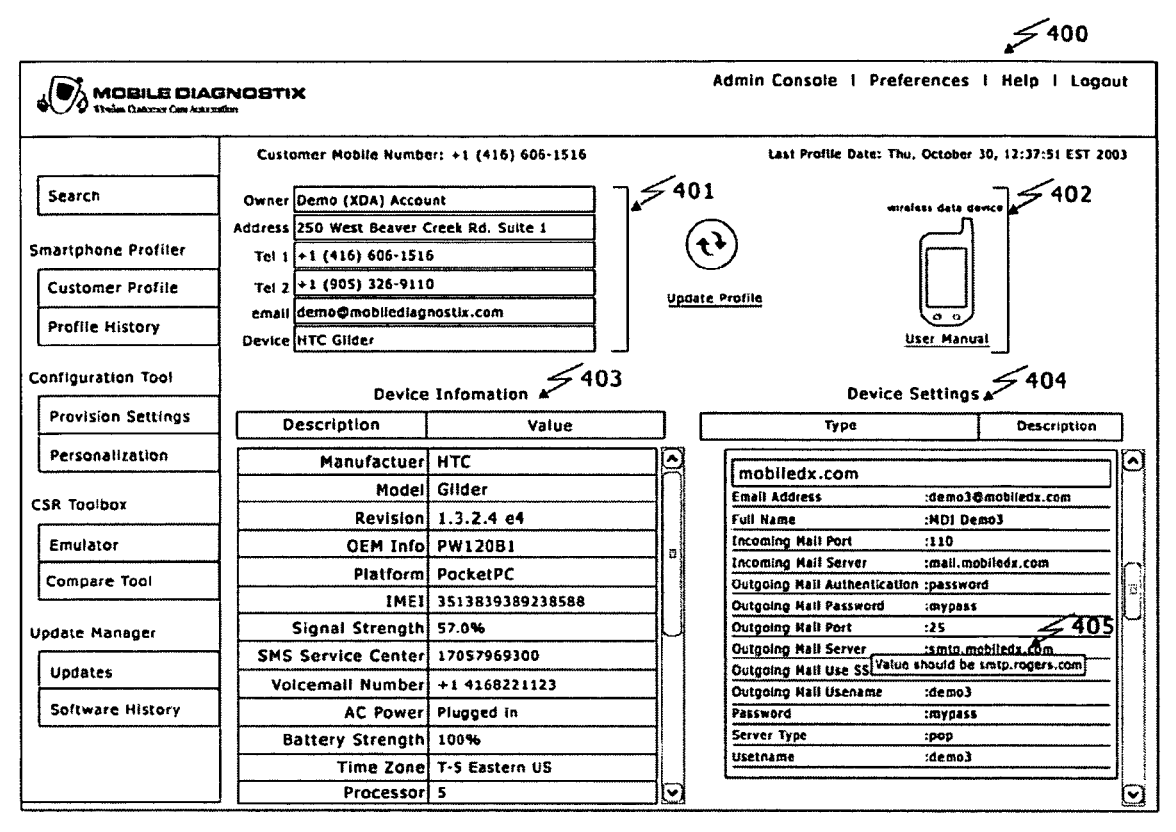

A sample CSR-GUI 400 is shown in FIG. 4. In the sample, the "Outgoing Mail Server" 405 highlighted indicating an inconsistency and also displaying the correct value.

The CSR-GUI 400 also shows entire profile of device gathered as description in applicants' previous application for the "Mobile Care Framework", filed Apr. 11, 2003, the disclosure of which is incorporated herein by reference. The profile displayed includes customer contact details 401, device type 402, device information 403 and settings 404.

The foregoing is considered as illustrative only of the principles of the invention. Further, since numerous modifications and changes will readily occur to those skilled in the art, it is not desired to limit the invention to the exact processes, components and applications shown and described, and accordingly, all suitable modifications and equivalents may be resorted to, falling within the scope of the invention and the appended claims and their equivalents. For instance, the "smartphone" could in fact comprise a PDA or advanced PDA, a mobile terminal, a camera, a toy, a gaming station, a vending machine, a vehicle, an appliance (such as a microwave oven or a coffee maker), or practically any kind of device capable of using data transmission means for communication.

Glossary of Acronyms

Industry Specific Acronyms
ESN Electronic Serial Number. It is a 32-bit identifier of a mobile device and used in TDMA, CDMA or an AMPS networks.
IMEI International Mobile Equipment Identity. It is a 56-bit identifier used in the GSM networks.
OSS Operational Support Systems
BSS Business Support Systems
OTA Over-the-Air is a standard for the transmission and reception of application-related information in a wireless communications system. In addition to short messages and small graphics, such files can contain instructions for subscription activation, banking transactions, ringtones, and Wireless Access Protocol (WAP) Settings.
WAP Wireless Application Protocol
GSM Global System for Mobile Communications
GPRS General Packet Radio Service. A GSM based packet data protocol using up to all 8 of the time slots in a GSM Channel.
SMS Short Message Service
CDMA Code Division Multiple Access
1XRTT CDMA2000 Radio Transmission Technology (1X-RTT), a wide-band, spread spectrum radio interface that uses Code Division Multiple Access (CDMA) technology to meet the needs for third generation (3G) wireless communications systems.
ACHT Average Call Handling Time
MIDP Mobile Information Device Profile
BREW Binary Runtime Environment for Wireless
CSR Customer Service Representative
GUI Graphical User Interface
XML Extensible Markup Language
JSP Java Server Pages
ODBC Open Database Connectivity, a standard database access method
JDBC Java Database Connectivity Invention Specific Acronyms
MCF Mobile Care Framework
MCE Mobile Care Engine

What is claimed is:

1. A mobile care engine system for providing customer care to mobile devices, comprising:
   a first data store containing profile data from a mobile device;
   a second data store containing reference value data for the mobile device;
   an analytics engine in communication with the customer care application and the first and second data stores, comprising:
      a comparing means for comparing profile data for the mobile device with reference value data for the mobile device; and
      an identifying means for identifying inconsistencies between the profile data and the reference value data;
   a graphical user interface GUI of a Customer Service Representative CSR, the GUI presenting the inconsistencies as highlighted items on a display so the CSR can accurately identify the inconsistencies for a subscriber of the mobile device, wherein the inconsistencies are highlighted on the display by indicating at least one of (i) correct information according to the reference value data; and (ii) a corrective action that can be initiated through the customer care application, wherein the inconsistencies are also provided to a display on the mobile device.

2. The mobile care engine system of claim 1, wherein the mobile care engine system further comprises means for activating the reference value data in the mobile device to rectify the inconsistency identified.

3. The mobile care engine system of claim 2, wherein the reference value data is locally activated in the mobile device.

4. The mobile care engine system of claim 2, wherein the reference value data is remotely activated in the mobile device.

5. The mobile care engine system of claim 1, wherein the profile data comprises configuration settings, resident applications and version numbers, make and model of the mobile device, total and available memory, total and available storage, battery life, connection strength, connection settings, user requests, usage statistics, soft reset count, recently used applications, memory heap.

6. The mobile care engine system of claim 1, wherein the reference value data comprises optimized values of configuration settings, resident applications and version numbers, make and model of the mobile device, total and available memory, total and available storage, battery life, connection strength, connection settings, user requests, usage statistics, soft reset count, recently used applications, memory heap.

7. The mobile care engine system of claim 1, wherein the inconsistencies are automatically analyzed and presented to the CSR to reduce manual effort to determine the inconsistencies.

8. The mobile care engine system of claim 1, wherein the analytics engine uses a rule set.

9. The mobile care engine system of claim 8, wherein the rule set comprises rules that are to be processed in a preselected order.

10. The mobile care engine system of claim 8, wherein each rule has an "IF . . . THEN" syntax.

11. The mobile care engine system of claim 10, wherein the "IF" portion of each rule comprises a comparison between a profile data field and a reference value field for a particular mobile device.

12. The mobile care engine system of claim 10, wherein the "THEN" portion of each rule passes an inconsistency value to the identifying means if an inconsistency is determined in the "IF" portion.

13. The mobile care engine system of claim 8, wherein the mobile care engine further comprises a rules authoring interface for authoring and editing the rule set.

14. The mobile care engine system of claim 1, wherein the mobile device comprises a smartphone.

15. The mobile care engine system of claim 1, wherein the mobile device comprises a personal data assistant.

16. The mobile care engine system of claim 1, wherein the mobile device comprises a wireless-networked computer.

17. The mobile care engine system of claim 16, wherein the computer is embedded within an appliance.

18. A method, comprising:
   collecting configuration settings from a mobile phone;
   retrieving a set of latest configuration settings from a database;
   comparing at a server the configuration settings of the mobile phone to the latest configuration settings;
   determining at the server inconsistencies between the configuration settings of the mobile phone to the latest configuration settings; and
   presenting the inconsistencies as highlighted items on a display to a Customer Service Representative CSR so the CSR can accurately determine the inconsistencies for a subscriber of the mobile phone, wherein the inconsistencies are also provided to a display on the mobile phone.

19. The method of claim 18 further comprising:
   analyzing by the server the inconsistencies;
   presenting analyzed data of the inconsistencies to the CSR who can explain to the subscriber the inconsistencies in the configuration settings of the mobile phone.

* * * * *

UNITED STATES PATENT AND TRADEMARK OFFICE
CERTIFICATE OF CORRECTION

PATENT NO. : 7,643,826 B2 Page 1 of 1
APPLICATION NO. : 10/889693
DATED : January 5, 2010
INVENTOR(S) : Jeffrey Brunet et al.

It is certified that error appears in the above-identified patent and that said Letters Patent is hereby corrected as shown below:

In column 9, line 42, in Claim 1, delete "GUI" and insert -- (GUI) --, therefor.

In column 9, line 43, in Claim 1, delete "CSR," and insert -- (CSR), --, therefor.

In column 10, line 51, in Claim 18, delete "CSR" and insert -- (CSR) --, therefor.

Signed and Sealed this

Fourth Day of May, 2010

David J. Kappos
*Director of the United States Patent and Trademark Office*